(12) United States Patent
Nakahara et al.

(10) Patent No.: US 11,476,770 B2
(45) Date of Patent: Oct. 18, 2022

(54) DC-DC CONVERTER INCLUDING FIRST AND SECOND FULL-BRIDGE CIRCUITS FOR PERFORMING SOFT SWITCHING AND REDUCING SWITCHING LOSSES

(71) Applicant: DIAMOND & ZEBRA ELECTRIC MFG. CO., LTD., Osaka (JP)

(72) Inventors: Shogo Nakahara, Osaka (JP); Hiroyoshi Nakayama, Osaka (JP)

(73) Assignee: DIAMOND & ZEBRA ELECTRIC MFG. CO., LTD., Osaka (JP)

( * ) Notice: Subject to any disclaimer, the term of this patent is extended or adjusted under 35 U.S.C. 154(b) by 20 days.

(21) Appl. No.: 17/048,144

(22) PCT Filed: Apr. 24, 2019

(86) PCT No.: PCT/JP2019/017378
§ 371 (c)(1),
(2) Date: Oct. 16, 2020

(87) PCT Pub. No.: WO2020/003717
PCT Pub. Date: Jan. 2, 2020

(65) Prior Publication Data
US 2021/0167689 A1 Jun. 3, 2021

(30) Foreign Application Priority Data
Jun. 25, 2018 (JP) .............................. JP2018-119550

(51) Int. Cl.
*H02M 3/335* (2006.01)
*H02M 1/00* (2006.01)

(52) U.S. Cl.
CPC ... *H02M 3/33573* (2021.05); *H02M 3/33584* (2013.01); *H02M 1/0058* (2021.05)

(58) Field of Classification Search
CPC .............................................. H02M 3/335–42
See application file for complete search history.

(56) References Cited

U.S. PATENT DOCUMENTS

2011/0249472 A1 10/2011 Jain et al.
2015/0229225 A1* 8/2015 Jang .................. H02M 3/33569
  363/17

(Continued)

FOREIGN PATENT DOCUMENTS

JP 2013-027201 A 2/2013
JP 2015-211581 A 11/2015

(Continued)

OTHER PUBLICATIONS

Krismer, Florian et al., "Efficiency-Optimized High-Current Dual Active Bridge Converter for Automotive Applications", IEEE Transactions on Industrial Electronics, vol. 59, No. 7, IEEE, Jul. 2012, p. 2745-2760.

(Continued)

*Primary Examiner* — Peter M Novak
(74) *Attorney, Agent, or Firm* — McDermott Will & Emery LLP

(57) ABSTRACT

A DC-DC converter has a configuration in which a first full-bridge circuit and a second full-bridge circuit are connected via a transformer and an inductor. A control circuit performs soft switching of each switching element in the first full-bridge circuit and the second full-bridge circuit. An inductor current flowing through an equivalent inductor at a time of switching of turning on or off each switching element is greater than or equal to a threshold current, the equivalent inductor being equivalent to the transformer and the inductor. The control circuit outputs predetermined power by changing a voltage output period of the first full-bridge circuit and a voltage output period of the second full-bridge circuit while fixing the switching frequency and keeping a polarity inversion period at a value greater than or equal to a fixed value, the polarity inversion period being a period in which the output of the second full-bridge circuit and the output of the first full-bridge circuit have reverse (Continued)

polarities. This enables performing ZVS operations by simple control and reducing switching losses.

5 Claims, 8 Drawing Sheets

(56) References Cited

U.S. PATENT DOCUMENTS

2015/0349649 A1* 12/2015 Zane ................ H02M 3/33592
363/21.03
2016/0087545 A1    3/2016 Higaki et al.

FOREIGN PATENT DOCUMENTS

| JP | 2016-012970 A | 1/2016 |
| JP | 2017-130997 A | 7/2017 |
| WO | 2015/004825 A1 | 1/2015 |

OTHER PUBLICATIONS

International Search Report issued in corresponding International Patent Application No. PCT/JP2019/017378, dated Jun. 18, 2019, with English translation.
Japanese Notice of Reasons for Refusal issued in corresponding Japanese Patent Application No. 2018-119550, dated Feb. 22, 2022, with English translation.

* cited by examiner

DC-DC CONVERTER INCLUDING FIRST AND SECOND FULL-BRIDGE CIRCUITS FOR PERFORMING SOFT SWITCHING AND REDUCING SWITCHING LOSSES

CROSS REFERENCE TO RELATED APPLICATIONS

This application is the U.S. National Phase under 35 U.S.C. § 371 of International Application No. PCT/JP2019/017378, filed on Apr. 24, 2019, which claims the benefit of Japanese Application No. 2018-119550, filed on Jun. 25, 2018, the entire contents of each are hereby incorporated by reference.

TECHNICAL FIELD

The present invention relates to an isolated DC-DC converter that performs soft switching by simple control and reduces switching losses.

BACKGROUND ART

Power converters such as DC-DC converters employ zero voltage switching (hereinafter, referred to as "ZVS") in order to reduce switching losses and achieve high-efficiency power transfer or in order to reduce noise and suppress switching surges so as to enable the use of low-cost, low withstand voltage devices. Patent Document 1 discloses a DC-DC converter capable of high-efficiency power transfer by implementing ZVS operations when there is a large voltage difference between a primary direct-current voltage and a secondary direct-current voltage. The DC-DC converter described in Patent Document 1 detects power on each of the primary and secondary sides and increases or decreases the duties of primary switches and the duties of secondary switches so as to minimize a power difference between the two sides. This allows implementation of ZVS operations.

PRIOR ART DOCUMENT

Patent Document

Patent Document 1: Japanese Patent Application Laid-Open No. 2016-012970

SUMMARY OF INVENTION

Problems to be Solved by Invention

However, in order to implement ZVS operations, Patent Document 1 requires detecting power on both of the primary and secondary sides and performing switching control. This complicates the circuit configuration and control of the circuit configuration, thus making it difficult to improve productivity and achieve cost reduction.

It is an object of the present invention to provide a DC-DC converter that performs ZVS operations by simple control and reduces switching losses.

Means for Solving Problems

In order to solve the above-described problem, a DC-DC converter according to a first aspect of the present invention includes a first full-bridge circuit including four switching elements that include a capacitor serving as a parasitic capacitance or an external parallel-connected capacitor, a second full-bridge circuit including four switching elements that include a capacitor serving as a parasitic capacitance or an external parallel-connected capacitor, and a transformer including a first winding and a second winding. The first winding is connected to the first full-bridge circuit, and the second winding is connected to the second full-bridge circuit and magnetically coupled to the first winding. The DC-DC converter further includes an inductance component connected in series with the first winding or the second winding, and a control circuit that controls soft switching of each switching element in the first full-bridge circuit and the second full-bridge circuit. An inductor current flowing through an equivalent inductor at a time of switching of turning on or off each switching element is greater than or equal to a threshold current, the equivalent inductor being equivalent to the transformer and the inductance component. The control circuit outputs predetermined power by fixing a switching frequency and changing a voltage output period of the first full-bridge circuit and a voltage output period of the second full-bridge circuit while fixing a switching frequency and keeping a polarity inversion period at a value greater than or equal to a fixed value, the polarity inversion period being a period in which an output of the first full-bridge circuit and an output of the second full-bridge circuit have reverse polarities.

A second aspect of the present invention is the DC-DC converter of the first aspect, in which the control circuit changes the voltage output period of the first full-bridge circuit and the voltage output period of the second full-bridge circuit while making them equal.

A third aspect of the present invention is the DC-DC converter of the second aspect, in which the control circuit performs control to satisfy the following expression:

$$P = \frac{V_x \cdot V_y}{2\pi L \omega}[-3\tau^2 + 4(\tau_C + \pi) - 2\tau_C^2 - 2\pi\tau_C - \pi^2]$$

where P is output power, $\tau$ is the voltage output period of the first switching circuit and the voltage output period of the second switching circuit, $\tau_c$ is the polarity inversion period, $V_x$ is an input voltage of the first full-bridge circuit, $V_y$ is an input voltage of the second full-bridge circuit, and L is an inductance of the equivalent inductor. In the above expression, $\tau$ and $\tau_c$ are parameters indicating times and expressed in radian measure.

A fourth aspect of the present invention is the DC-DC converter of the first aspect, in which the control circuit changes the voltage output period of the first full-bridge circuit and the voltage output period of the second full-bridge circuit while making them different from each other.

A fifth aspect of the present invention is the DC-DC converter of the fourth aspect, in which the control circuit performs control to satisfy the following expression:

$$P = \frac{V_x \cdot V_y}{2\pi L \omega}$$
$$[2\tau_C^2 - 2\tau_2\tau_C - 2\tau_1\tau_C + 2\pi\tau_C + \tau_2^2 + \tau_1\tau_2 - 2\pi\tau_2 + \tau_1^2 - 2\pi\tau_1 + \pi^2]$$

where P is output power, $\tau_1$ is the voltage output period of the first switching circuit, $\tau_2$ is the voltage output period of the second switching circuit, $\tau_c$ is the polarity inversion period, $V_x$ is an input voltage of the first full-bridge circuit, $V_y$ is an input voltage of the second full-bridge circuit, and $L$ is an inductance of the equivalent inductor. In the above expression, $\tau_1$, $\tau_2$, and $\tau_c$ are parameters indicating times and expressed in radian measure.

A sixth aspect of the present invention is the DC-DC converter of the first to fifth aspects, in which the threshold current is set to make energy accumulated in the equivalent inductor greater than or equal to energy accumulated in two of the capacitors.

A seventh aspect of the present invention is the DC-DC converter of the sixth aspect, in which the control circuit performs control to satisfy the following expression:

$$I_{ref} = \alpha \cdot V_x \sqrt{(2C/L)}$$

where $L_{ref}$ is the threshold current, $V_x$ is an input voltage of the first full-bridge circuit, C is a capacitance of the capacitors, L is an inductance of the equivalent inductor, and $\alpha$ is a correction factor for correcting the threshold current $I_{ref}$ and set to an appropriate value as necessary.

Advantageous Effects of Invention

According to the first to seventh aspects of the present invention, it is possible to easily implement ZVS operations and thereby reduce switching losses by appropriately controlling the voltage output periods of both of the full-bridge circuits. Besides, the fixed switching frequency suppresses an increase in switching loss resulting from an increase in switching frequency and thereby reduces heat generation of electrical devices such as an inductor.

DESCRIPTION OF EMBODIMENTS

An embodiment of the present invention will be described hereinafter with reference to the drawings. The following description takes the example of using a dual-active-bridge (DAB) converter (hereinafter, referred to as a "DC-DC converter") as a "DC-DC converter" according to the present invention.

1. Circuit Configuration of DC-DC Converter

Figure 1:
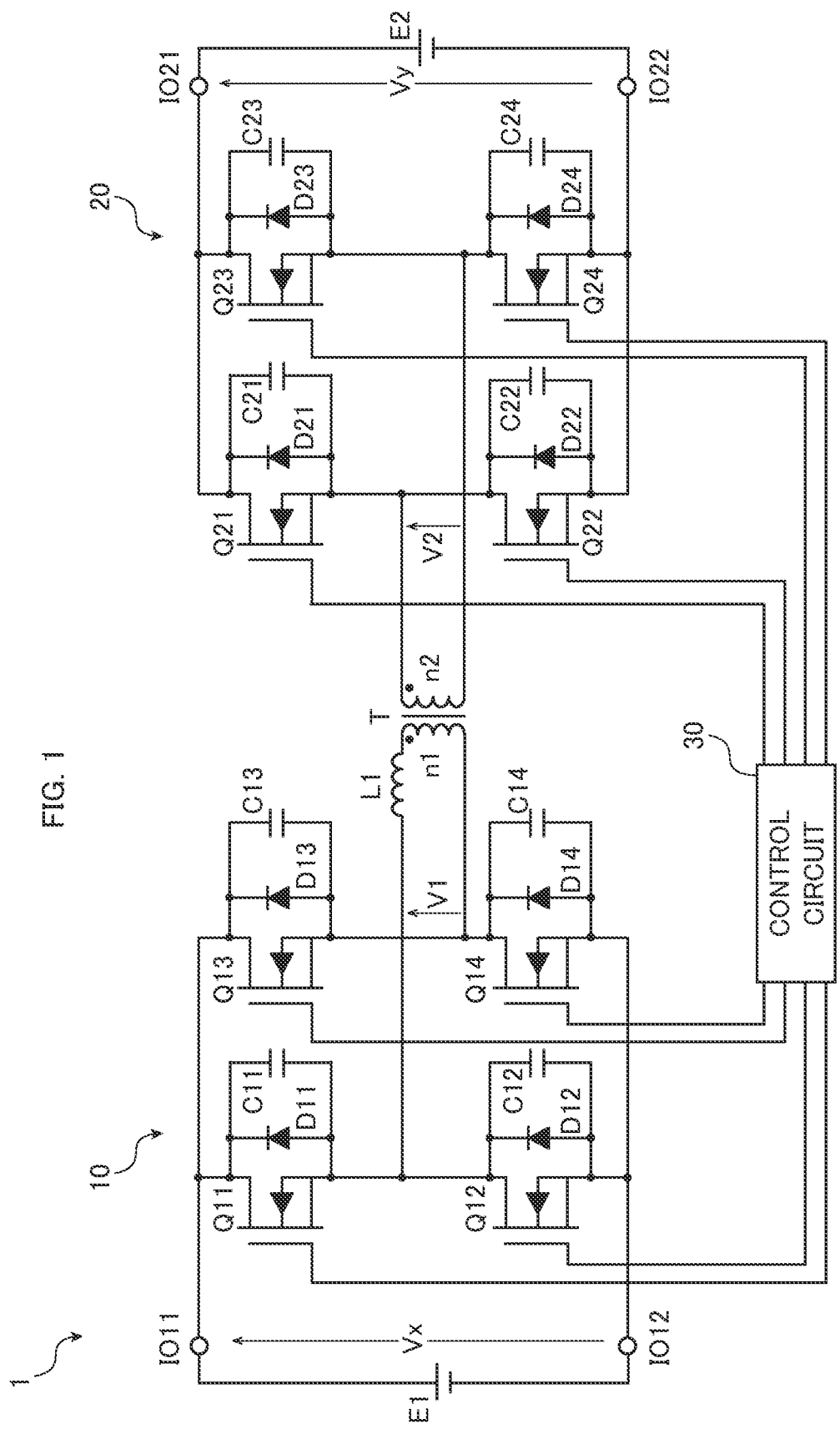
FIG. 1 is a circuit diagram of a DC-DC converter according to an embodiment.

FIG. 1 is a circuit diagram of a DC-DC converter 1 according to an embodiment of the present invention.

The DC-DC converter 1 includes a pair of input/output terminals IO11 and IO12 and a pair of input/output terminals IO21 and IO22. The pair of input/output terminals IO11 and IO12 is connected to a direct-current power supply E1. The pair of input/output terminals IO21 and IO22 is connected to a direct-current power supply E2.

The DC-DC converter 1 transforms a power supply voltage of the direct-current power supply E1 that is input from the input/output terminals IO11 and IO12, and outputs the transformed voltage from the input/output terminals IO21 and IO22. The DC-DC converter 1 also transforms a power supply voltage of the direct-current power supply E2 that is input from the input/output terminals IO21 and IO22, and outputs the transformed voltage from the input/output terminals IO11 and IO12. That is, the DC-DC converter 1 is a converter capable of bidirectional power transfer.

The DC-DC converter 1 includes a first full-bridge circuit 10, a second full-bridge circuit 20, and a transformer T.

The transformer T includes a first winding n1 and a second winding n2. The first winding n1 and the second winding n2 are magnetically coupled to each other. The first winding n1 is connected to the input/output terminals IO11 and IO12 via the first full-bridge circuit 10. The second winding n2 is connected to the input/output terminals IO21 and IO22 via the second full-bridge circuit 20.

The first full-bridge circuit 10 includes a first leg in which switching elements Q11 and Q12 are connected in series, and a second leg in which switching elements Q13 and Q14 are connected in series. The switching element Q11 is connected in parallel with a diode D11 and a capacitor C11, the switching element Q12 is connected in parallel with a diode D12 and a capacitor C12, the switching element Q13 is connected in parallel with a diode D13 and a capacitor C13, and the switching element Q14 is connected in parallel with a diode D14 and a capacitor C14. The switching elements Q11 to Q14 are MOS-FETs. Alternatively, the switching elements Q11 to Q14 may be other transistors such as IGBTs or JFETs. The diodes D11 to D14 may be actual elements or parasitic diodes. Each of the capacitors C11 to C14 may be an actual element, a parasitic capacitance, or a combination of a parasitic capacitance and an actual element.

The first winding n1 of the transformer T is connected to the midpoint of each of the first leg and the second leg. An inductor L is provided between the first winding n1 of the transformer T and the midpoint of the first leg. Note that the location of the inductor L may be appropriately changed as long as the inductor L is connected in series with either the first winding n1 or the second winding n2. For example, the inductor L may be provided between the first winding n1 and the midpoint of the second leg. The inductor L may be an actual element, a leakage inductance of the transformer T, or a combination of an actual element and a leakage inductance.

The second full-bridge circuit 20 includes a third leg in which switching elements Q21 and Q22 are connected in series, and a fourth leg in which switching elements Q23 and Q24 are connected in series. The switching element Q21 is connected in parallel with a diode D21 and a capacitor C21, the switching element Q22 is connected in parallel with a diode D22 and a capacitor C22, the switching element Q23 is connected in parallel with a diode D23 and a capacitor C23, and the switching element Q24 is connected in parallel with a diode D24 and a capacitor C24. The switching elements Q21 to Q24 are MOS-PETs. Alternatively, the switching elements Q21 to Q24 may be other transistors such as IGBTs or JFETs. The diodes D21 to D24 may be actual elements or parasitic diodes. Each of the capacitors C21 to C24 may be an actual element, a parasitic capacitance, or a combination of a parasitic capacitance and an actual element.

The second winding n2 of the transformer T is connected to the midpoint of each of the third leg and the fourth leg.

The aforementioned inductor L1 may be provided between the second winding n2 and the midpoint of either the third leg or the fourth leg.

The gate terminals of the switching elements Q11 to Q14 and Q21 to Q24 are wired to a circuit so as to be capable of receiving signals output from a control circuit 30. The control circuit 30 controls switching of each of the switching elements Q11 to Q14 and Q21 to Q24 so that the output power of the DC-DC converter 1 becomes set target power. In the present embodiment, the control circuit 30 performs soft switching of each of the switching elements Q11 to Q14 and Q21 to Q24 in order to reduce switching losses.

2. Soft Switching Operations

Soft switching operations of the switching elements Q11 to Q14 and Q21 to Q24 will be described hereinafter. The present embodiment adopts 3-level DAB control.

The DC-DC converter 1 transfers power from either the input/output terminals IO11 and IO12 or the input/output terminals IO21 and IO22 to the other, or vice versa. The following description is given on the assumption that the input/output terminals IO11 and IO12 are on the input side (primary side) and the input/output terminals IO21 and IO22 are on the output side (secondary side).

Figure 2:
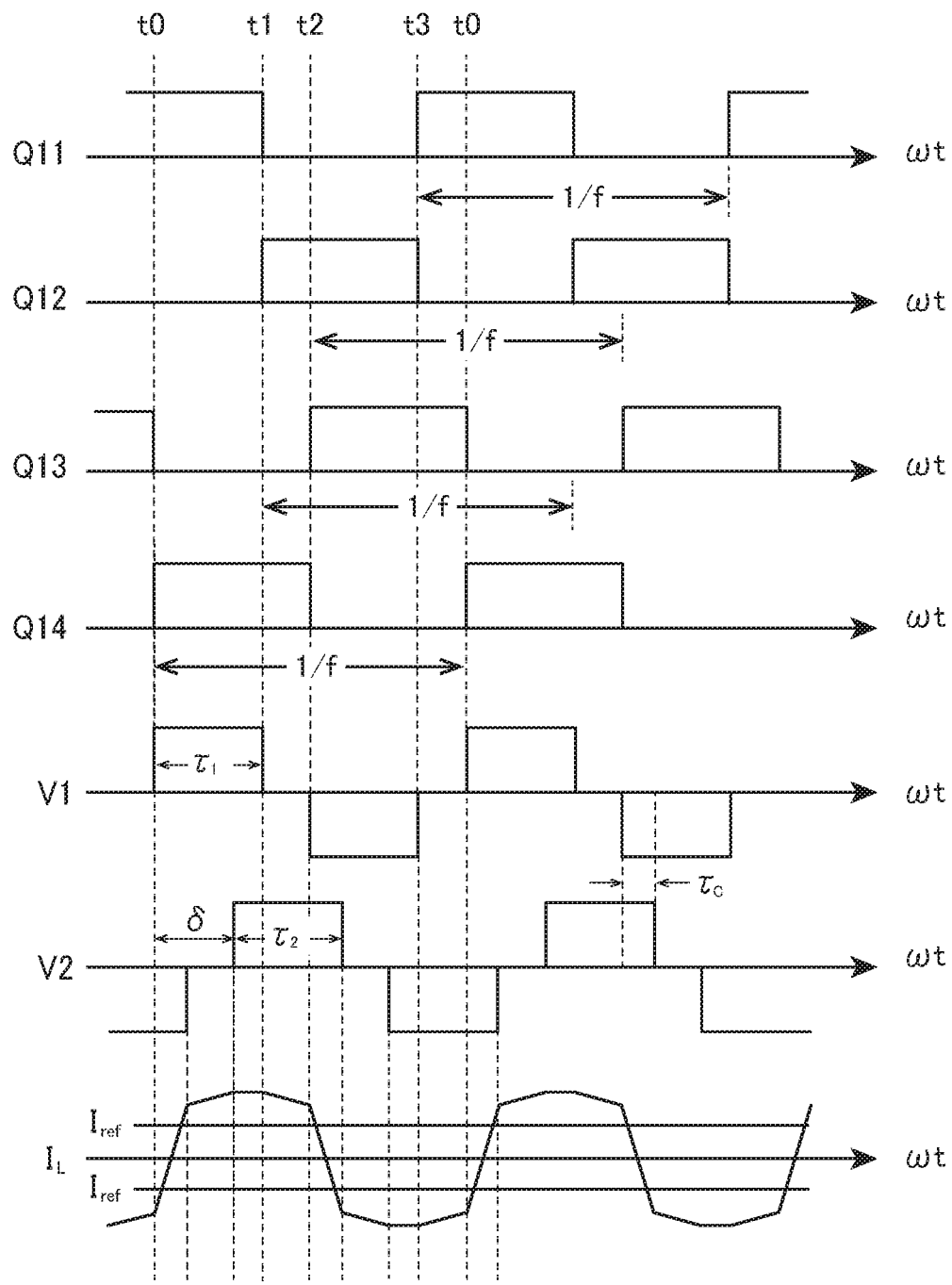
FIG. 2 is a diagram illustrating a timing chart of the DC-DC converter.

FIG. 2 is a diagram illustrating a timing chart of the DC-DC converter 1. FIGS. 3, 4, 5, 6, 7, and 8 are illustrations of current paths in the DC-DC converter 1. In FIGS. 3 to 8, the second full-bridge circuit 20 is not shown, and the inductor L and the transformer T in FIG. 1 are expressed as an equivalent inductor L.

The timing chart of only the switching elements Q11 to Q14 in the first full-bridge circuit 10 is illustrated in FIG. 2. In FIG. 2, V1 indicates the voltage between the midpoint of the switching elements Q11 and Q12 and the midpoint of the switching elements Q13 and Q14, illustrated in FIGS. 1, and V2 indicates the voltage between the midpoint of the switching elements Q21 and Q22 and the midpoint of the switching elements Q23 and Q24.

In this example, the direct-current power supplies E1 and E2 are assumed to supply the same power supply voltage., and $I_L$ indicates an inductor current flowing through the inductor L (see FIGS. 3 to 8).

The control circuit 30 provides a phase difference and controls switching of the first full-bridge circuit 10 and the second full-bridge circuit 20. In the following description, the phase difference between the first full-bridge circuit 10 and the second full-bridge circuit 20 is expressed as δ. The control circuit 30 performs phase-shift PWM control at a switching frequency f (in the cycle of 1/f) on each of the first full-bridge circuit 10 and the second full-bridge circuit 20.

The following description is given of switching control performed on each of the switching elements Q11 to Q14 of the first full-bridge circuit 10. The switching of the second full-bridge circuit 20 is controlled such that the voltage V2 has a waveform illustrated in FIG. 2. This can be described in the same manner as the switching control of the first full-bridge circuit 10. Thus, in FIGS. 3 to 8, only current paths in the first full-bridge circuit 10 are illustrated in order to simplify the description. In each drawing, each switching element is indicated by a simplified graphical symbol.

Period from t0 to t1

In the period from t0 to t1, the switching elements Q11 and Q14 are ON and the switching elements Q12 and Q13 are OFF.

Figure 3:
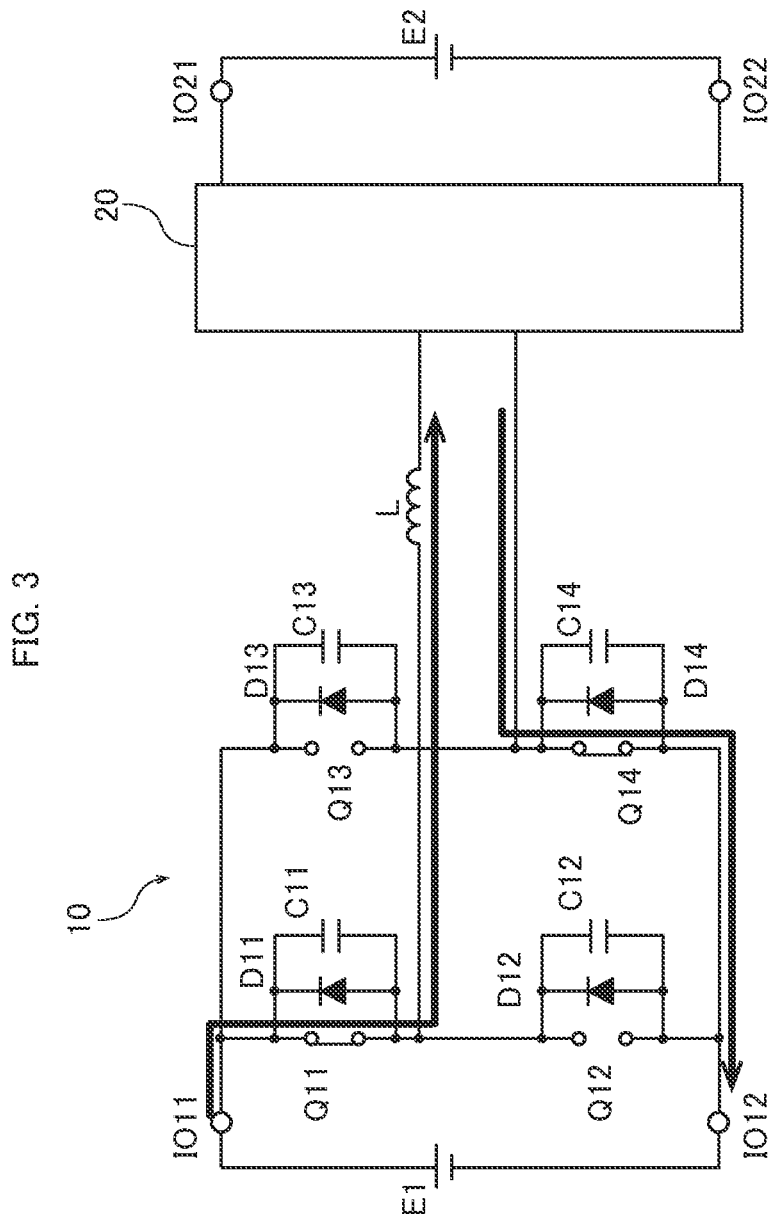
FIG. 3 is an illustration of a current path in the DC-DC converter.

In this case, current flows in a path from the direct-current power supply E1 through the switching element Q11, the inductor L, the second full-bridge circuit 20, and the switching element Q14 to the direct-current power supply E1 as illustrated in FIG. 3. During this period, the voltage V1 is high.

Figure 4:
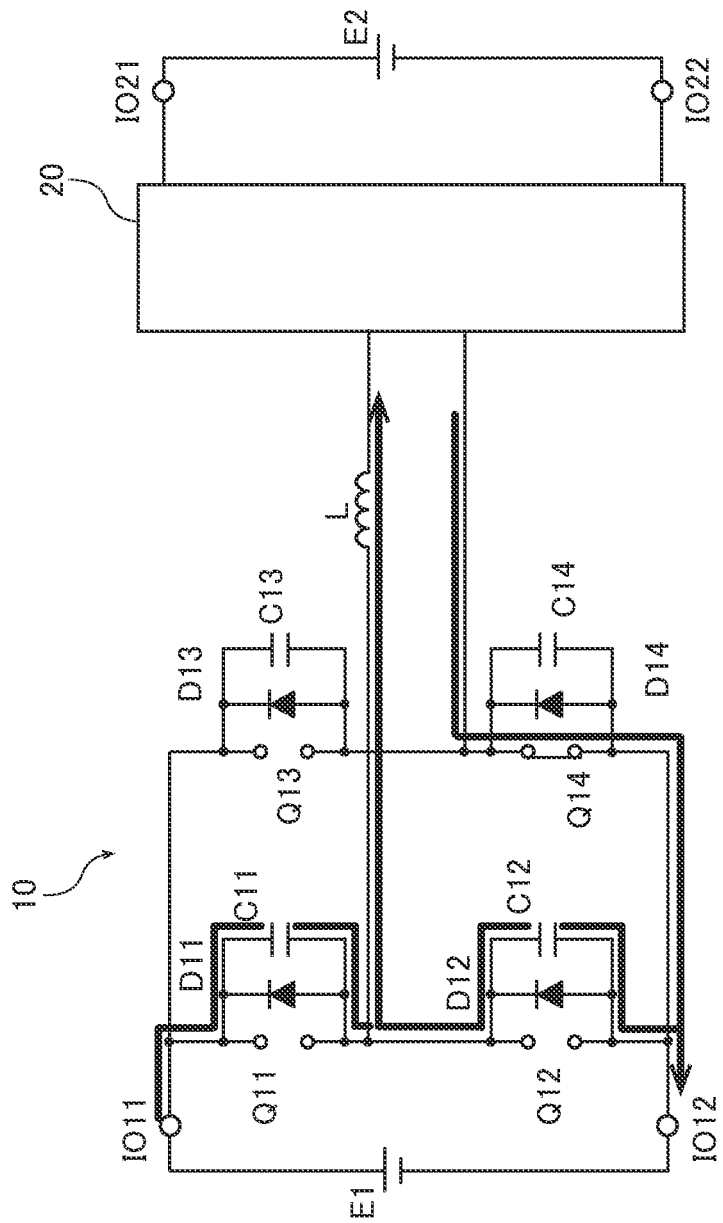
FIG. 4 is an illustration of a current path in the DC-DC converter.

At time t1, the switching element Q11 is turned off, and then the switching element Q12 is turned on after a dead-time interval. During this dead-time interval, the switching elements Q11 and Q12 are both OFF. At this time, the inductor current $I_L$ continues to flow through the inductor L due to the property of the inductor L, so that current flows from each of the capacitors C11 and C12 to the inductor L as illustrated in FIG. 4. Then, the capacitor C11 is charged, and the capacitor C12 is discharged. When the capacitor C12 has been discharged, the drain-source voltage of the switching element Q12 becomes zero. If the switching element Q12 is turned on at this time, this turn-on is achieved by ZVS.

Period from t1 to t2

Figure 5:
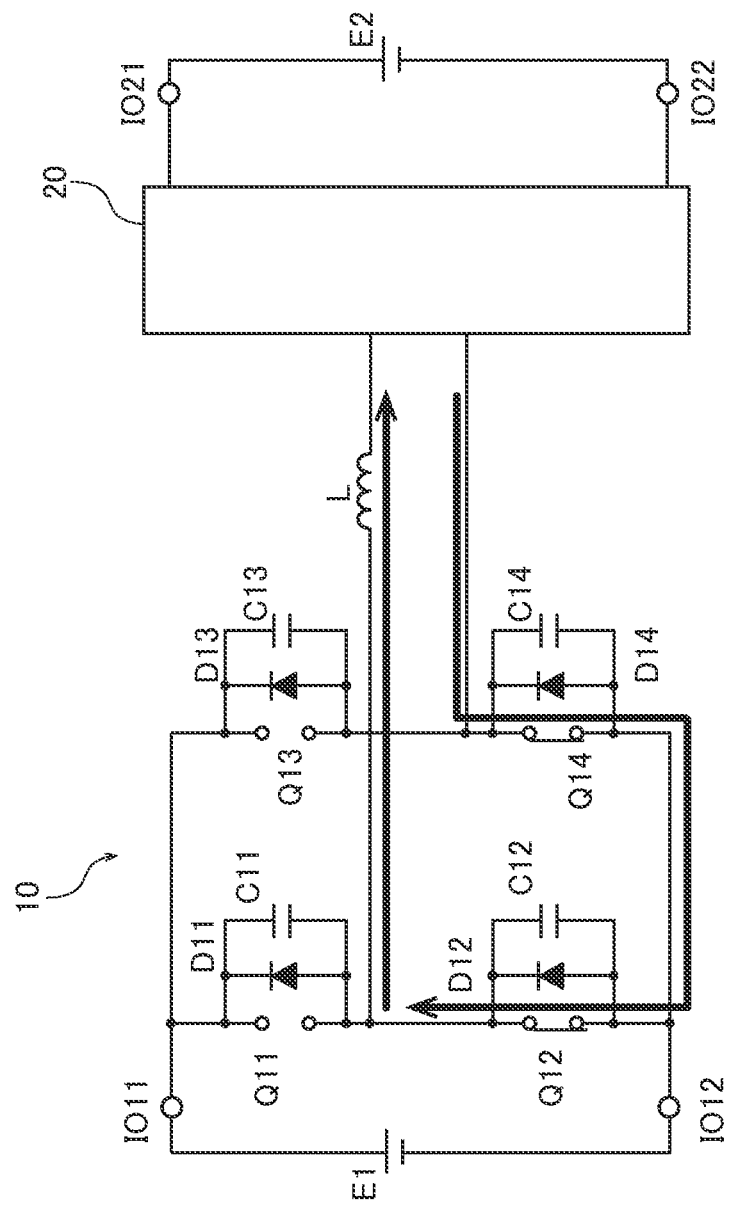
FIG. 5 is an illustration of a current path in the DC-DC converter.

In the period from t1 to t2, the switching elements Q12 and Q14 are ON and the switching elements Q11 and Q13 are OFF. In this case, current flows in a path from the switching elements Q14 and Q12 to the inductor L as illustrated in FIG. 5. At this time, the voltage V1 is zero.

At time t2, the switching element Q14 is turned off, and then the switching element Q13 is turned on after a dead-time interval. During this dead-time interval, the capacitor C14 is charged, and the capacitor C13 is discharged as described with reference to FIG. 4. When the capacitor C13 has been discharged, the drain-source voltage of the switching element Q13 becomes zero. If the switching element Q13 is turned on at this time, this turn-on is achieved by ZVS.

Period from t2 to t3

Figure 6:
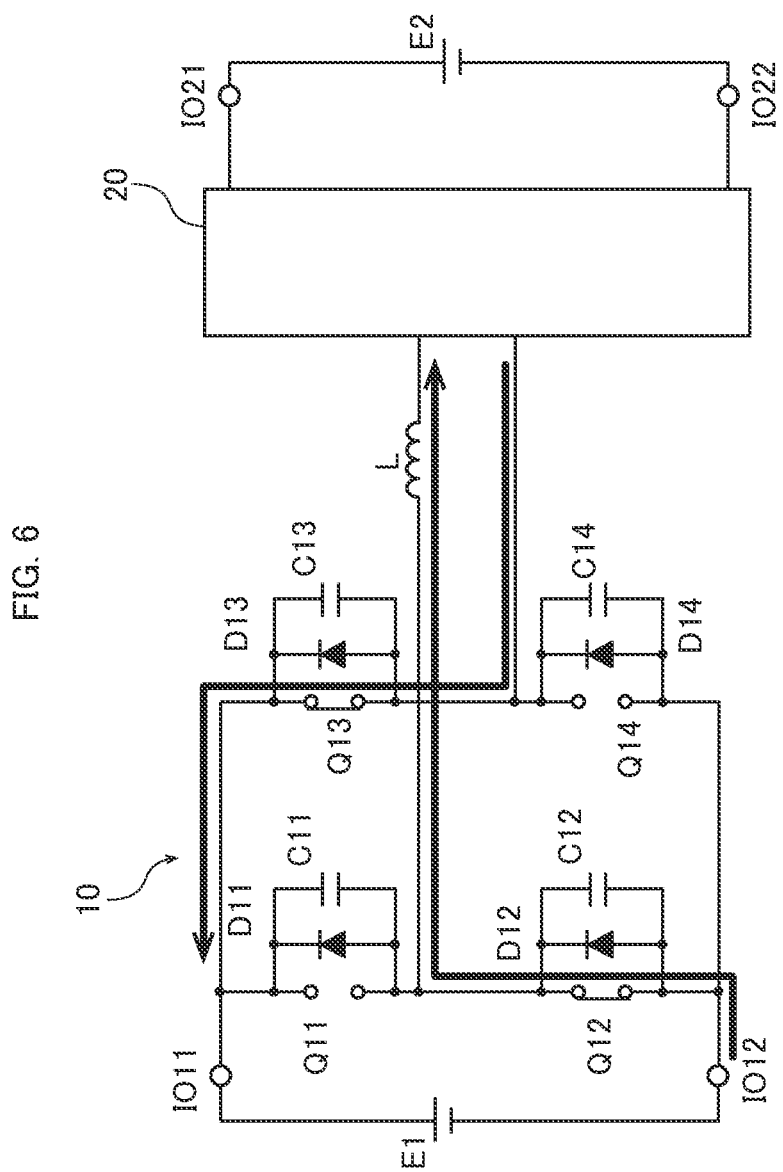
FIG. 6 is an illustration of a current path in the DC-DC converter.
Figure 7:
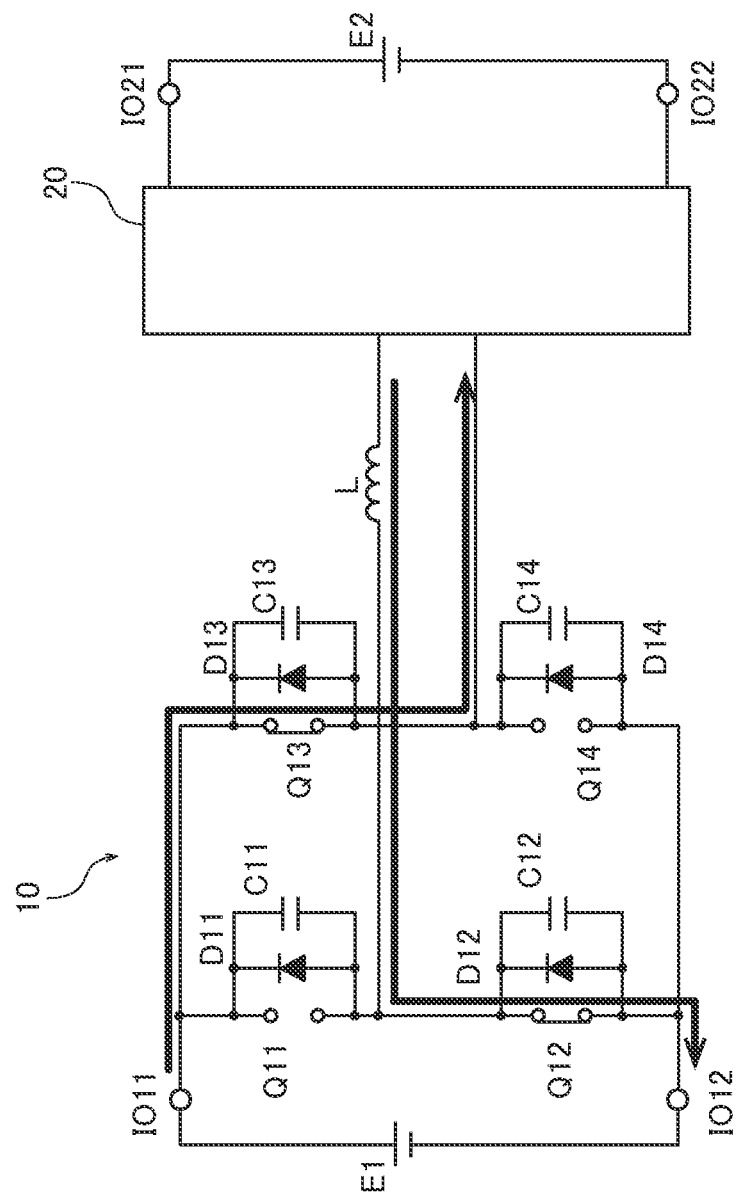
FIG. 7 is an illustration of a current path in the DC-DC converter.

In the period from t2 to t3, the switching elements Q12 and Q13 are ON and the switching elements Q11 and Q14 are OFF. Immediately after the switching element Q13 is turned on at time t2, current flows in a path from the direct-current power supply E1 through the switching element Q12, the inductor L, the second full-bridge circuit 20, and the switching element Q13 to the direct-current power supply E1 as illustrated in FIG. 6. This current flows back to the direct-current power supply E1 and, as a result, current flows in a path from the direct-current power supply E1 through the switching element Q13, the second full-bridge circuit 20, the inductor L, and the switching element Q12 to the direct-current power supply E1 as illustrated in FIG. 7. The polarity of the voltage V1 in this period is the reverse of that in the period from t0 to t1.

At time t3, the switching element Q12 is turned off, and then the switching element Q11 is turned on after a dead-time interval. Then, the capacitor C12 is charged, and the capacitor C11 is discharged as described with reference to FIG. 4. When the capacitor C11 has been discharged, the drain-source voltage of the switching element Q11 becomes zero. If the switching element Q11 is turned on at this time, this turn-on is achieved by ZVS.

Period from t3 to t0

Figure 8:
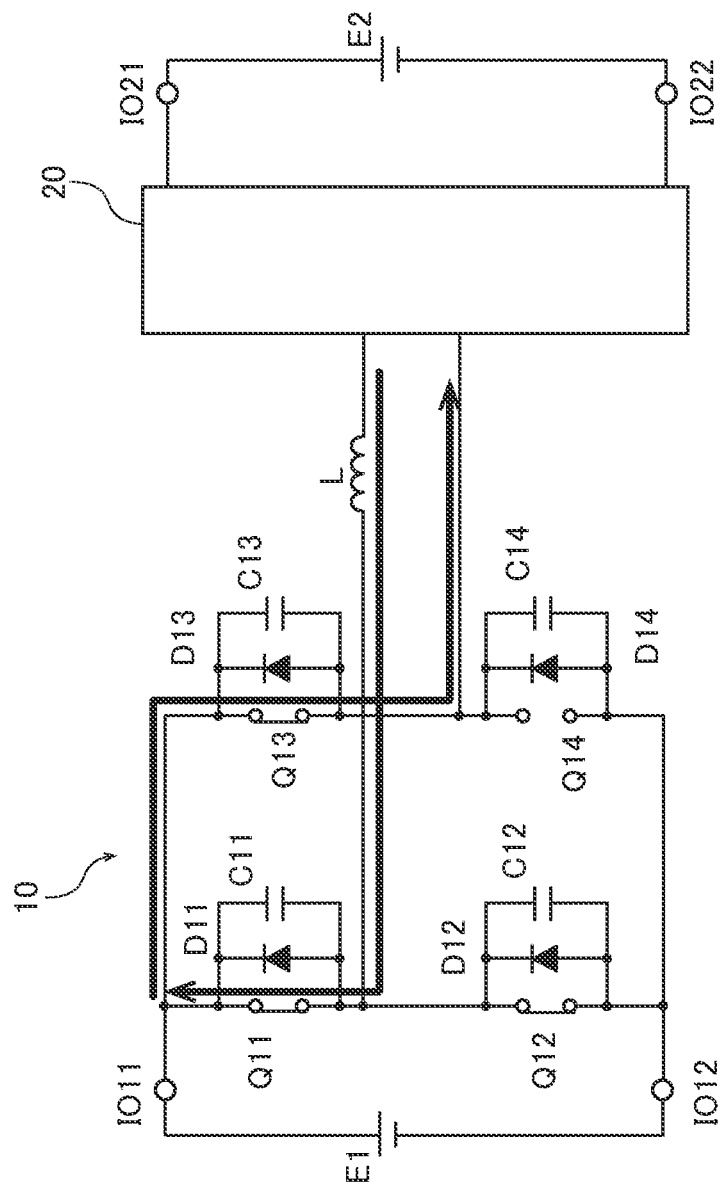
FIG. 8 is an illustration of a current path in the DC-DC converter.

In the period from t3 to t0, the switching elements Q11 and Q13 are ON and the switching elements Q12 and Q14 are OFF. In this case, current flows in a path from the inductor L through the switching element Q11 to the switching element Q13 as illustrated in FIG. 8. At this time, the voltage V1 is zero.

At time t0, the switching element Q13 is turned off, and then the switching element Q14 is turned on after a dead-time period. Then, the capacitor C13 is charged and the capacitor C14 is discharged as described with reference to FIG. 4. When the capacitor C14 has been discharged, the drain-source voltage of the switching element Q14 becomes zero. If the switching element Q14 is turned on at this time, this turn-on is achieved by ZVS. Then, the converter transitions to the state illustrated in FIG. 3.

The switching control as described above causes the voltage V1 to transition so as to have a waveform illustrated in FIG. 2. As a result of the control circuit 30 controlling the switching of the second full-bridge circuit 20, the voltage V2 transitions so as to have a waveform illustrated in FIG. 2. Since, as described above, the switching of the first full-bridge circuit 10 and the second full-bridge circuit 20 is controlled with the phase difference δ, a phase difference between the rising edge of the voltage V1 and the rising edge of the voltage V2 becomes δ.

3. Output Power of DC-DC Converter

The control circuit 30 controls the phase of each switching element to control the output power of the DC-DC converter 1.

Here, a polarity inversion period in which the voltages V1 and V2 have reverse polarities is expressed as $\tau_c$. Also, the voltage output period of the first full-bridge circuit 10 is expressed as $\tau_1$, and the voltage output period of the second full-bridge circuit 20 is expressed as $\tau_2$. Here, $\tau_1$, $\tau_2$, and $\tau_c$ express times in angular (radian) measure.

The control circuit 30 controls the output power of the DC-DC converter 1 by changing the voltage output periods $\tau_1$ and $\tau_2$ while keeping constant the switching frequency f and the polarity inversion period $\tau_c$. The voltage output period $\tau_1$ can be changed by controlling the phase of each switching element in the first full-bridge circuit 10. The voltage output period $\tau_2$ can be changed by controlling the phase of each switching element in the second full-bridge circuit 20.

The fixed value $\tau_c$ is set so as to enable ZVS of each switching element. Thus, $\tau_c$ has to satisfy the condition given by Expression (1) below.

$$\tau_C \geq \frac{I_{ref} \cdot L}{V_x} \quad (1)$$

In Expression (1) above, L is the inductance of the inductor L illustrated in, for example, FIG. 3, and $V_x$ is the power supply voltage of the direct-current power supply E1 (see FIG. 1).

Also, $I_{ref}$ is the current value of the inductor current $I_L$ required to achieve ZVS. As described above, for example if the drain-source voltage of the switching element Q13 becomes zero after the charge of the capacitor C14 and the discharge of the capacitor C13 during the dead-time interval at time t2, the turn-on of the switching element Q13 is achieved by ZVS. That is, the ZVS of the switching element Q13 becomes possible if the energy of the inductor L is at least greater than or equal to the energy accumulated in each of the capacitors C13 and C14. To achieve this, Expression (2) below has to hold.

$$\frac{1}{2}LI_L^2 \geq \frac{1}{2} \cdot 2CV_x^2 \quad (2)$$

In expression (2), $I_L$ is the inductor current flowing through the inductor L, and C is the capacitance of each of the capacitors C11 to C14. Then, Expression (2) is transformed into Expression (3) below. In Expression (3), α is the correction factor and set to an appropriate value as necessary. Here, it is assumed that α=1.

$$I_L \geq \alpha \cdot V_x \sqrt{\frac{2C}{L}} \quad (3)$$

If the inductor current $I_L$ is greater than or equal to $\alpha \cdot V_x \sqrt{(2C/L)}$ in Expression (3), ZVS of the switching element becomes possible. That is, a threshold current $I_{ref}$ can be expressed as $\alpha \cdot V_x \sqrt{(2C/L)}$. If the condition $|I_L| \geq |I_{ref}|$ is satisfied at each time when each switching element is turned on, ZVS of the switching element becomes possible.

Next, if the output power of the DC-DC converter 1 is expressed as P and $\tau_1$ and $\tau_2$ are expressed as $\tau_1 = \tau_2 = \tau$, the power P can be expressed by Expression (4) below.

$$P = \frac{V_x \cdot V_y}{2\pi L \omega}[-3\tau^2 + 4(\tau_C + \pi) - 2\tau_C^2 - 2\pi\tau_C - \pi^2] \quad (4)$$

where $V_{y+-}$ is the power supply voltage of the direct-current power supply E2 (see FIG. 1).

In Expression (4), $V_x$ and $V_y$ are known values, and $\tau_c$ is expressed by Expression (1) above. The power P is a target value desired to be output from the DC-DC converter 1 and is known. Therefore, if the target value of the power desired to be output from the DC-DC converter 1 is given, $\tau(=\tau_1=\tau_2)$ can be calculated from the inverse function of Expression (4).

The control circuit 30 controls the switching of each of the first full-bridge circuit 10 and the second full-bridge circuit 20 such that $\tau_1$ and $\tau_2$ become τ obtained from Expression (4). Accordingly, the DC-DC converter 1 outputs the target power P.

As described above, in the present embodiment, the switching frequency f is fixed to control the output of the DC-DC converter 1. This suppresses an increase in switching loss resulting from an increase in switching frequency. Moreover, since there is no increase in switching frequency, it is possible to reduce heat generation of devices, in particular, the inductor L. Also, since $\tau_1$ and $\tau_2$, which are changed for output control, are set such that the inductor current $I_L$ greater than or equal to the threshold current $I_{ref}$ flows through the inductor L, it is possible to achieve ZVS of each switching element. As a result, high-efficiency power conversion can be achieved. This control does not require complicated control and therefore enables performing ZVS operations by simple control and reducing switching losses.

4. Variations

While one embodiment of the present invention has been described thus far, the present invention is not intended to be limited to the above-described embodiment.

In the above-described embodiment, Expression (4) is based on the condition of $\tau=\tau_1=\tau_2$, but $\tau_1$ may be different from $\tau_2$. In this case, $\tau_1$ and $\tau_2$ for outputting the target power P can be calculated from Expression (5) below.

$$P = \frac{V_X \cdot V_y}{2\pi L \omega} \quad (5)$$
$$[2\tau_C^2 - 2\tau_2\tau_C - 2\tau_1\tau_C + 2\pi\tau_C + \tau_2^2 + \tau_1\tau_2 - 2\pi\tau_2 + \tau_1^2 - 2\pi\tau_1 + \pi^2]$$

In the above-described embodiment, the switching frequency f and the polarity inversion period $\tau_c$ are kept constant. Alternatively, as another example, the power output of the DC-DC converter 1 may be controlled by changing the voltage output periods $\tau_1$ and $\tau_2$ while keeping the switching frequency constant and keeping the polarity inversion period $\tau_c$ at a value greater than or equal to a fixed value.

The above embodiment has been described on the assumption that the input/output terminals IO11 and IO12 are on the input side and the input/output terminals IO21 and IO22 are on the output side. However, the DC-DC converter 1 is capable of bidirectional power transfer. Accordingly, the input/output terminals IO11 and IO12 may be on the output side and the input/output terminals IO21 and IO22 may be on the input side. This case can be described in the same manner as in the above-described embodiment, and therefore a description thereof is omitted. Note that the DC-DC converter 1 does not necessarily have to be a bidirectional converter.

Each element in the above-described embodiments and variations may be combined appropriately within a range that presents no contradictions.

REFERENCE SIGNS LIST

| | |
|---|---|
| 1 | DC-DC converter |
| 10 | First full-bridge circuit |
| 20 | Second full-bridge circuit |
| 30 | Control circuit |
| C11, C12, C13, C14 | Capacitor |
| C21, C22, C23, C24 | Capacitor |
| D11, D12, D13, D14 | Diode |
| D21, D22, D23, D24 | Diode |
| E1, E2 | Direct-current power supply |
| IL | Inductor current |
| IO11, IO12 | Input/output terminal |
| IO21, IO22 | Input/output terminal |
| L | Inductor |
| L1 | Inductor |
| Q11, Q12, Q13, Q14 | Switching element |
| Q21, Q22, Q23, Q24 | Switching element |
| T | Transformer |
| V1 | Voltage |
| V2 | Voltage |

The invention claimed is:

1. A DC-DC converter for performing soft switching and reducing switching losses, the DC-DC converter comprising:
a first full-bridge circuit including four switching elements;
a second full-bridge circuit including four switching elements;
a transformer including a first winding and a second winding, the first winding being connected to said first full-bridge circuit, and the second winding being connected to said second full-bridge circuit and magnetically coupled to said first winding;
an inductance component connected in series with said first winding or said second winding; and
a control circuit that controls soft switching of each switching element in said first full-bridge circuit and said second full-bridge circuit,
wherein each switching element of said first and second full-bridge circuits includes a capacitor,
wherein said capacitor is a parasitic capacitance or a combination of a parasitic capacitance and an actual element,
wherein an inductor current flowing through an equivalent inductor at a time of switching of turning on or off each switching element is greater than or equal to a threshold current, the equivalent inductor being equivalent to said transformer and said inductance component,
wherein said control circuit changes a voltage output ON time of said first full-bridge circuit and a voltage output ON time of said second full-bridge circuit by controlling a phase of each switching element of said first and second full-bridge circuits to output power from said DC-DC converter, while fixing a switching frequency of said first and second full-bridge circuits and keeping a polarity inversion period at a value greater than or equal to a fixed value, the polarity inversion period being a period in which an output of said first full-bridge circuit and an output of said second full-bridge circuit have reverse polarities,
wherein said control circuit changes the voltage output ON time of said first full-bridge circuit and the voltage output ON time of said second full-bridge circuit while making them equal,
wherein said control circuit performs control to satisfy the following expression:

$$P = \frac{V_x \cdot V_y}{2\pi L \omega}[-3\tau^2 + 4(\tau_C + \pi) - 2\tau_C^2 - 2\pi\tau_C - \pi^2]$$

where P is output power, $\tau$ is the voltage output ON time of said first full-bridge circuit and the voltage output ON time of said second full-bridge circuit, $\tau_c$ is said polarity inversion period, $V_x$ is an input voltage of said first full-bridge circuit, $V_y$ is an input voltage of said second full-bridge circuit, and L is an inductance of said equivalent inductor, and
wherein in the above expression, $\tau$ and $\tau_c$ are parameters indicating times and expressed in radian measure.

2. The DC-DC converter according to claim 1, wherein said control circuit changes the voltage output ON time of said first full-bridge circuit and the voltage output ON time of said second full-bridge circuit while making them different from each other.

3. The DC-DC converter according to claim 1, wherein said threshold current is set to make energy accumulated in said equivalent inductor greater than or equal to energy accumulated in two of said capacitors.

4. A DC-DC converter for performing soft switching and reducing switching losses, the DC-DC converter comprising:
a first full-bridge circuit including four switching elements;
a second full-bridge circuit including four switching elements;
a transformer including a first winding and a second winding, the first winding being connected to said first full-bridge circuit, and the second winding being connected to said second full-bridge circuit and magnetically coupled to said first winding;
an inductance component connected in series with said first winding or said second winding; and
a control circuit that controls soft switching of each switching element in said first full-bridge circuit and said second full-bridge circuit, wherein each switching element of said first and second full-bridge circuits includes a capacitor, wherein said capacitor is a parasitic capacitance or a combination of a parasitic capacitance and an actual element, wherein an inductor current flowing through an equivalent inductor at a time of switching of turning on or off each switching element is greater than or equal to a threshold current, the equivalent inductor being equivalent to said transformer and said inductance component, wherein said control circuit changes a voltage output ON time of said first full-bridge circuit and a voltage output ON time of said second full-bridge circuit by controlling a phase of each switching element of said first and second full-bridge circuits to output power from said DC-DC converter, while fixing a switching frequency of said first and second full-bridge circuits and keeping a polarity inversion period at a value greater than or equal to a fixed value, the polarity inversion period being a period in which an output of said first full-bridge circuit and an output of said second full-bridge circuit have reverse polarities, wherein said control circuit performs control to satisfy the following expression:

$$P = \frac{V_x \cdot V_y}{2\pi L \omega} [2\tau_C^2 - 2\tau_2\tau_C - 2\tau_1\tau_C + 2\pi\tau_C + \tau_2^2 + \tau_1\tau_2 - 2\pi\tau_2 + \tau_1^2 - 2\pi\tau_1 + \pi^2]$$

where P is output power, $\tau_1$ is the voltage output ON time of said first full-bridge circuit, $\tau_2$ is the voltage output ON time of said second full-bridge circuit, $\tau_c$ is said polarity inversion period, $V_x$ is an input voltage of said first full-bridge circuit, $V_y$ is an input voltage of said second full-bridge circuit, and L is an inductance of said equivalent inductor, and wherein in the above expression, $\tau_1$, $\tau_2$, and $\tau_c$ are parameters indicating times and expressed in radian measure.

5. A DC-DC converter for performing soft switching and reducing switching losses, the DC-DC converter comprising:

a first full-bridge circuit including four switching elements;

a second full-bridge circuit including four switching elements;

a transformer including a first winding and a second winding, the first winding being connected to said first full-bridge circuit, and the second winding being connected to said second full-bridge circuit and magnetically coupled to said first winding;

an inductance component connected in series with said first winding or said second winding; and a control circuit that controls soft switching of each switching element in said first full-bridge circuit and said second full-bridge circuit, wherein each switching element of said first and second full-bridge circuits includes a capacitor, wherein said capacitor is a parasitic capacitance or a combination of a parasitic capacitance and an actual element, wherein an inductor current flowing through an equivalent inductor at a time of switching of turning on or off each switching element is greater than or equal to a threshold current, the equivalent inductor being equivalent to said transformer and said inductance component, wherein said control circuit changes a voltage output ON time of said first full-bridge circuit and a voltage output ON time of said second full-bridge circuit by controlling a phase of each switching element of said first and second full-bridge circuits to output power from said DC-DC converter, while fixing a switching frequency of said first and second full-bridge circuits and keeping a polarity inversion period at a value greater than or equal to a fixed value, the polarity inversion period being a period in which an output of said first full-bridge circuit and an output of said second full-bridge circuit have reverse polarities, wherein said control circuit performs control to satisfy the following expression:

$$I_{ref} = \alpha \cdot V_x \sqrt{(2C/L)}$$

where $L_{ref}$ is said threshold current, $V_x$ is an input voltage of said first full-bridge circuit, C is a capacitance of said capacitors, L is an inductance of said equivalent inductor, and α is a correction factor.

* * * * *